United States Patent Office 3,368,582
Patented Feb. 13, 1968

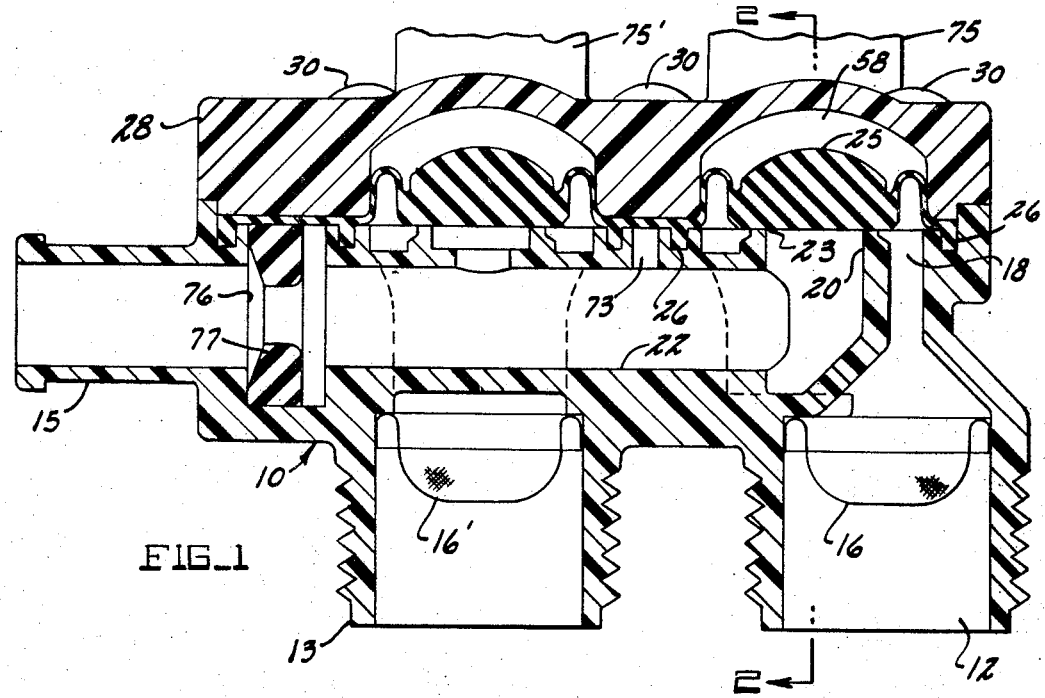
FIG_1
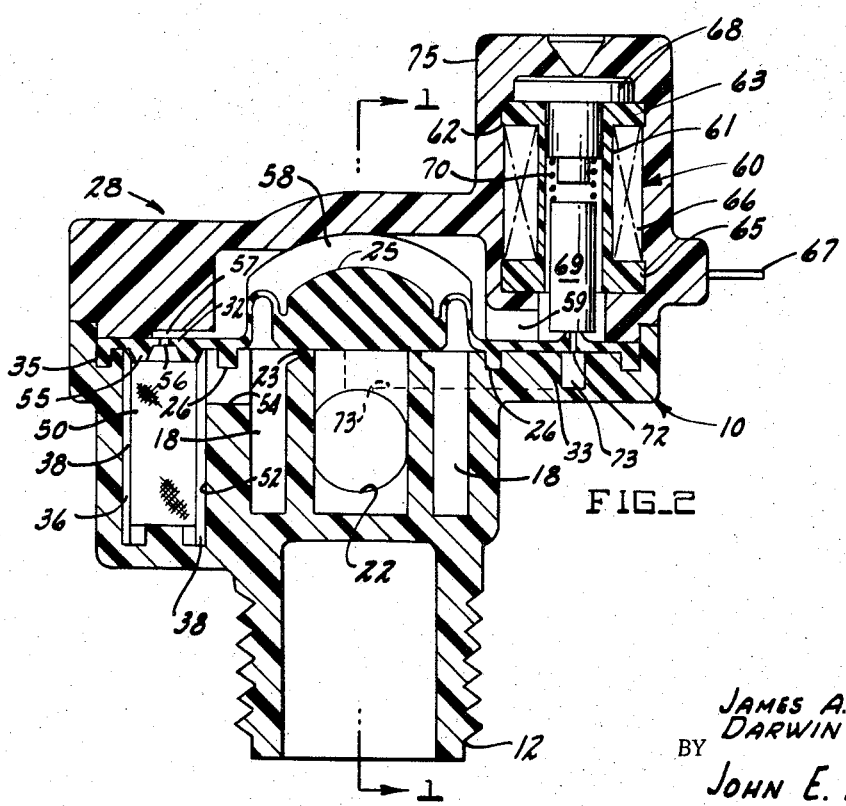
FIG_2
INVENTORS.
JAMES A. KOZEL
DARWIN R. GRAHL
BY
JOHN E. McRAE
TENNES I. ERSTAD
ATTORNEYS

3,368,582
PILOT-OPERATED VALVE INCLUDING
REMOVABLE FILTER
James A. Kozel, Franklin, and Darwin Robert Grahl,
Lincoln Park, Mich., assignors to American Radiator
& Standard Sanitary Corporation, New York, N.Y.,
a corporation of Delaware
Filed Apr. 22, 1965, Ser. No. 450,086
7 Claims. (Cl. 137—549)

This invention relates to pilot-operated valves such as are used for example in controlling the flow of hot and cold water in domestic clothes washing machines.

Such valves usually embody a molded plastic valve body defining concentric inlet and outlet chambers for each fluid stream, and valve element diaphragms overlying these chambers for movement toward and away from the respective seats. A metal cover structure clamps the periphery of each diaphragm in position and provides a chamber above the diaphragm central portion for receiving pressure fluid from the inlet chamber. When water is trapped in the chamber, as by de-energization of a pilot valve solenoid, the fluid pressure in the chamber is applied to the diaphragm to close same against the main seat. When the pilot valve solenoid is energized a fluid path is afforded to substantially empty the pressure chamber, whereby to permit the inlet chamber pressure to open the diaphragm.

In the commercially available valves the pilot valve element operates on a pilot opening located in the central portion of the diaphragm. The pilot element must thus have a sufficiently long stroke to clear the diaphragm as said diaphragm moves from its closed to its open position. For example the diaphragm may have a stroke of about .150 inch, necessitating a somewhat longer movement of the pilot element.

One object of the present invention is to provide a pilot-operated valve wherein the pilot opening is located remote from the diaphragm such that the pilot valve can have a relatively short stroke without interfering with the diaphragm movement. The shorter stroke is advantageous in reducing the size and cost of the solenoid used to move the pilot element.

The fluid handled by the valve is susceptible to containment of solid impurity, and hence the pilot flow opening is usually formed with a relatively large diameter to prevent clogging. In the commercially available valves the pilot opening is about .060 inch in diameter.

An object of the present invention is to provide a pilot-operated valve wherein the pilot fluid is filtered before it reaches the pilot opening, thus permitting employment of a relatively small diameter pilot valve opening, as for example .020 inch. The small diameter is of course advantageous in reducing solenoid power requirements and solenoid costs.

A further object is to provide a pilot-operated valve having desired features of minimum number of parts, small size, and low manufacturing cost.

Other objects of this invention will appear from the following description and appended claims, reference being had to the accompanying drawings forming a part of this specification wherein like reference characters designate corresponding parts in the several views.

In the drawing:

FIGURE 1 is a sectional view of one embodiment of the invention taken substantially on line 1—1 in FIG. 2.

FIG. 2 is a sectional view taken substantially on line 2—2 in FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In FIG. 1 there is shown a pilot-operated valve intended to handle the hot and cold streams of water supplied to domestic clothes washing machines. The valve comprises a molded plastic valve body 10 having a threaded tubular inlet 12 for fluid of one temperature, a threaded tubular inlet 13 for fluid of another temperature, and a tubular outlet 15. In the illustrated valve it is immaterial whether inlet 12 is connected in the hot water supply and inlet 13 to the cold water supply, or vice versa.

Inlet 12 delivers fluid through a hat-type strainer 16 to an annular inlet chamber 18 formed in the upper face of body 10. Extending downwardly from the upper body face is a cylindrical outlet chamber 20, which communicates with a discharge passage 22 extending within body 10 in axial alignment with tubular outlet 15. The annular wall separating chambers 18 and 20 forms an annular valve seat 23.

Overlying chambers 18 and 20 is a diaphragm 25 having a peripheral rib 26 which seats in an annular groove in the upper face of body 10. The diaphragm rib area is retained in place by the clamping action of an overlying molded plastic cover 28, said cover being retained on body 10 by a plurality of spaced screws 30. It will be noted from FIG. 2 that the diaphragm is part of an elastomeric sheet which includes a first stationary portion 32, the diaphragm portion, and another stationary portion 33.

Stationary sheet portion 32 is provided with a peripheral rib 35 which may be of circular configuration, and which merges with the left portion of rib 26, the arrangement being such as to form a seal around the periphery of portion 32 as well as diaphragm 25. Underlying sheet portion 32 is a generally cylindrical pocket 36 formed during the molding of body 10. At circumferentially spaced points around its periphery the pocket is provided with vertical ribs 38 which space the cylindrical filter member 50 away from the pocket side surface 52. As shown in the drawing, member 50 is a rod-like member of porous sintered metal. It could, however, take other forms, as for example porous spongy polyurethane, porous cellulose acetate, or a hollow cylindrical screen of fine wire mesh. The pores in the filter member should be rather fine, as for example in the twenty-five to seventy-five micron range. Clogging is not a major problem since the filter is required to handle only a small percentage, on the order of 1% or less, of the total fluid handled by the valve. On a domestic clothes washing machine application the filter might be required to handle something on the order of three hundred gallons of water over a ten year period.

During service a minor part of the fluid in chamber 18 passes through opening 54, from where it is channeled downwardly by certain ones of the ribs 38. As it reaches the lower floor of pocket 36 the fluid passes radially inwardly, and thence upwardly through the filter member and between the remaining ribs 38. The fluid thus circulates around and through the entire filter member. Bypassing the filter member is impossible because the upper face of said member tightly engages an annular rib 55 formed on sheet portion 32.

Extending through sheet portion 32 is a relatively small opening 56 (less than .010 inch in diameter for example) which registers with a recess 57 in the underface of cover 28. Fluid can thus pass through filter 50 and opening 56 to recess 57 and a larger chamber or recess 58 formed above diaphragh 25. Further flow is permitted from recess 57 into a third recess 59 located in the right end portion of cover 28. Recesses 57, 58 and 59 are preferably formed as part of a single concavity in the underface of cover 28; most conveniently the concavity is formed as part of the cover molding operations.

As shown in FIG. 2, the right end portion 75 of cover 28 is of enlarged height, whereby to accommodate an encapsulated solenoid 60, of the type more particularly described in co-pending U.S. patent application, Ser. No. 336,685, filed Jan. 9, 1964. Briefly the solenoid comprises a dielectric bobbin or spool 62 having a tubular central portion 61, an upper end wall or flange 63, and a lower end wall or flange 65. An electrical winding 66 is wound around tubular portion 61, and the ends thereof are suitably affixed to spade-type terminals 67 mounted in wall 65. A rivet-type pole piece 68 is inserted in the upper end of spool 62, after which the solenoid assembly is encapsulated within cover 28 as part of the cover molding operation. Thus the solenoid is positioned as in insert in the mold cavity when the cover is initially molded.

During service an armature-plunger 69 is disposed within recess 59 for upward movement toward pole piece 68 upon energization of solenoid 60. Upon de-energization of the solenoid a compression spring 70 urges the plunger downwardly to its illustrated position closing the pilot opening 72 in elastomeric sheet portion 33. With plunger 69 in the illustrated position fluid accumulates in recess 58 to develop a downward fluid pressure on diaphragm 25 sufficient to maintain same closed against seat 23. When solenoid 60 is energized to raise plunger 69 away from opening 72 the fluid in recess 59 flows through opening 72 into a groove-like passage 73 formed in the upper face of valve body 10. As shown in FIG. 2, passage 73 communicates with main discharge passage 22, thereby affording a path for bleeding fluid from recess 58 to permit the pressure in inlet chamber 18 to raise diaphragm 25 from seat 23.

FIG. 2 illustrates the control or pilot flow passage system used to control the position of diaphragm 25 for the fluid flowing through inlet 12. It should be understood that a similar pilot flow passage system is contemplated for controlling the flow through inlet chamber 13. Thus inlet chamber 18' communicates with a second chamber similar to chamber 36, and cover 28 is provided with a second set of recesses corresponding to recesses 57, 58 and 59. The vertical enlargement 75 containing solenoid 60 is duplicated at 75' to provide a solenoid control for the second pilot flow. Preferably, although not necessarily, the bleed discharge from this second pilot flow system is handled through a groove in body 10 which communicates with groove 73. As will be apparent from FIG. 1, the illustrated elastomeric sheet includes additional non-illustrated portions corresponding to portions 32, 25 and 33 shown in FIG. 2.

The entire valve preferably employs but one molded elastomeric element, a single molded valve body 10, and a single molded cover 28 (having two solenoids encapsulated therewith). The valve body can have mounting bosses formed integrally therewith as more particularly shown in the aforementioned patent application, Ser. No. 336,685. If desired the valve body can be equipped with a molded pocket 76 for containing a conventional rubber flow control member 77.

A primary advantage of the illustrated valve resides in the utilization of filter means 50 in the molded pocket 36 to handle only the pilot fluid. By thus filtering the pilot fluid we are able to materially reduce the size of opening 72 as compared with prior art practice. This size reduction is made possible because the filter insures clean pilot fluid, thus eliminating any possibility of dirt or scale or the like clogging the small openings 56 and 72. As will be apparent, the reduced size of opening 72 permits a smaller coil 60 than would otherwise be possible, thereby contributing to lowered overall costs.

In the illustrated valve the filtering function is obtained at relatively low cost since the filter pocket is provided as part of the body molding operation, and the closure portion 32 is provided as part of the operation of molding the elastomeric element. Some cost is of course involved in member 50. This cost may however be balanced by a saving involved in possible elimination of strainer screens 16 and 16'. Thus, we have found that most malfunctions due to contaminants arise because of clogging in the pilot flow passage system and not because of clogging at the main seats 23 or 23'. It thus may be possible to entirely eliminate the main strainer screens or to substitute low cost screens having a very coarse mesh, as for example thirty mesh or lower. The valve can of course be used in any desired attitude or position, inverted, upright or tilted.

The illustrated valve utilizes a preferred arrangement wherein pilot opening 72 is located in a fixed position remote from diaphragm 25, thus permitting plunger 69 to have a relatively short stroke (less than .03 inch) without interfering with the diaphragm travel. It is possible however to obtain some of the previously mentioned filter advantages in an arrangement wherein the pilot openings is located directly in the diaphragm. Other modifications may of course be resorted to without departing from the spirit of the invention as set forth in the accompanying claims.

What is claimed:

1. A pilot-operated valve comprising a molded plastic valve body having concentric inlet and outlet chambers formed in one of its faces and defining an intervening valve seat; an elastomeric sheet located on said one face; a molded plastic cover having one face thereof positioned on said one face of the valve body in clamping engagement with peripheral areas of said elastomeric sheets; a pocket formed in said one face of the valve body in fluid communication with the inlet chamber; filter means disposed in said pocket to filter fluid passing therethrough; said cover having a first recess in said one cover face registering with the pocket, a second recess in said one cover face registering with the inlet and outlet chambers, and a third recess in said one cover face; said molded valve body having a recess in said one body face registering with the third recess in the cover, and passage means interconnecting the valve body recess with the outlet chamber; said elastomeric sheet including a first stationary portion interposed between the filter pocket and first cover recess, a second movable diaphragm portion interposed between the valve seat and second cover recess, and a third stationary portion interposed between the third cover recess and valve body recess; said sheet having a first bleed opening extending through its first stationary portion and a second bleed opening extending through its third stationary portion; said first cover recess communicating directly with the second cover recess, and said second cover recess communicating directly with the third cover recess, whereby a pilot flow path is established from the inlet chamber through the filter means, first sheet opening, first cover recess, second cover recess, third cover recess, second sheet opening, valve body recess, valve body passage means, and outlet chamber; a solenoid carried by the molded cover; and an armature controlled by the solenoid for movement toward and away from the second opening to close and open the pilot flow path.

2. The valve of claim 1 wherein the filter means is dimensioned to fit snugly between the elastomeric sheet and an opposing surface of the confining pocket.

3. The valve of claim 1 wherein the filter means comprises a cylindrical member positioned with its axis parallel to the axis of the inlet chamber.

4. The valve of claim 3 wherein the pocket is formed by valve body surfaces which define ribs extending parallel to the filter member axis; said ribs engaging side surfaces of the filter member and directing fluid axially therealong.

5. The valve of claim 2 wherein the elastomeric sheet is provided with an annular rib surrounding the first opening and engaging the filter means to seal tightly thereagainst.

6. A pilot-operated valve comprising a valve body defining an inlet chamber outlet chamber and intervening valve seat formed in one of the valve body faces; an elastomeric diaphragm having its periphery located on said one body face and having its central portion movable toward and away from the seat; a pocket formed in said one body face in fluid communication with the inlet chamber; filter means disposed in said pocket to filter fluid passing therethrough; a diaphragm extension overlying the pocket in the valve body; a bleed opening in said diaphragm extension for accepting fluid from the filter means; a cover having one face thereof positioned on said one value body face in clamping engagement with the diaphragm periphery and extension periphery; said cover having a pilot flow concavity in said one cover face for receiving fluid from said bleed opening and applying same to the face of the diaphragm remote from the valve seat; and solenoid means carried by the cover for controlling fluid flow out of the cover concavity; said filter means being dimensioned to fit snugly between the diaphragm extension and an opposing surface of the confining pocket.

7. The valve of claim 6 wherein the diaphragm extension is provided with an annular rib surrounding the opening and engaging the filter means to seal tightly thereagainst.

References Cited

UNITED STATES PATENTS

| | | | |
|---|---|---|---|
| 948,405 | 2/1910 | Webb | 251—129 X |
| 1,643,500 | 9/1927 | Jacobson et al. | 251—45 |
| 2,235,304 | 3/1941 | Toussaint | 251—45 |
| 3,126,911 | 3/1964 | Galley | 251—30 X |
| 3,249,120 | 5/1966 | Kozel et al. | 251—30 X |

M. CARY NELSON, *Primary Examiner.*

A. ROSENTHAL, J. E. KNIGHT, *Assistant Examiners.*